United States Patent [19]

Owen et al.

[11] Patent Number: 4,713,222
[45] Date of Patent: Dec. 15, 1987

[54] IRON REMOVAL FROM BAYER PROCESS LIQUOR

[75] Inventors: David O. Owen, Aurora; Lawrence J. Connelly, Oak Lawn, both of Ill.

[73] Assignee: Nalco Chemical Company, Naperville, Ill.

[21] Appl. No.: 890,206

[22] Filed: Jul. 28, 1986

[51] Int. Cl.$^4$ .............................................. C01G 49/00
[52] U.S. Cl. .................................... 423/122; 423/121; 423/140; 423/DIG. 1; 75/108; 210/705; 210/710
[58] Field of Search ............... 423/122, 124, 140, 121, 423/DIG. 1, 140; 210/688, 705, 710; 75/108, 2

[56] References Cited

U.S. PATENT DOCUMENTS

| | | | |
|---|---|---|---|
| 3,141,733 | 7/1964 | Broisman | 423/124 |
| 3,390,959 | 7/1968 | Sibert | 423/122 |
| 3,445,187 | 5/1969 | Sibert | 423/111 |
| 3,493,327 | 2/1970 | Cook | 423/121 |
| 3,681,012 | 8/1972 | Sibert | 423/123 |

OTHER PUBLICATIONS

Literature Search Report, Subject: Removal or Iron Impurities from Alumina in the Bayer Process, 1967, Dec. 1985, p. 3, 99/7/6, 183401 81-220223P Iron Separation from Sodium Aluminate, Solution, p. 7, 99/7/19, 131166 74-220106N, Removal of Iron Compounds from the Bayer Liquor, pp. 7-8, 99/7/20 130159 74-220064P, Iron Separation from Sodium Aluminate Solution Using Preheated Red Mud or Bauxite.

Literature Search Report, Subject: Removal or Iron Impurities from Alumina in the Bayer Process, 1967, Dec. 1985, pp. 15-16, Answer 36, and CA99(10):730-28u, AB Settling Properties of the Bauxite Residue are Affected etc.

*Primary Examiner*—Robert L. Stoll
*Attorney, Agent, or Firm*—John G. Premo; Anthony L. Cupoli; Donald G. Epple

[57] ABSTRACT

The following inorganic compounds of iron, when added to Bayer process liquors, form a precipitate of the finely divided iron present in:
  A. Ferric oxide;
  B. Ferrous salts; or
  C. Ferrous salts in combination with ferric oxide.

The precipitate is removed using a polymeric flocculating agent. This treatment reduces iron levels below those obtained using other iron removal treatments.

6 Claims, No Drawings

IRON REMOVAL FROM BAYER PROCESS LIQUOR

INTRODUCTION

In the production of alumina using the Bayer process, bauxite is digested at an elevated temperature with a concentrated caustic solution to dissolve the alumina values present in the red mud and produce a concentrated solution of sodium aluminate. The iron values and other impurities in the bauxite for the most part do not dissolve, thus leaving behind and impure sodium aluminate solution. This solution is then treated to cause precipitation of the alumina.

It is now known that the Bayer liquors, prior to alumina precipitation, contain substantial quantities of iron compounds which are an undesirable impurity. Much of this iron is sub-micron size, e.g.,—0.45 micron or may be soluble and is difficult to remove. Iron presents a number of problems. The most difficult problem being that it tends to interfere with the precipitation of alumina from the Bayer process liquors and if entrained in the alumina in large amounts, is an undesirable impurity when the alumina is sequentially converted to aluminum metal.

Because of the many undesirable results of iron in alumina, most alumina producers have placed maximum iron content specifications on alumina produced by the Bayer process.

As indicated, due to the fine particle size of the iron present in the Bayer process liquor, conventional separation techniques using standard flocculants or coagulants do not work particularly well. This will be pointed out in more detail hereafter.

If it were possible to readily remove or reduce the finely divided or soluble iron content of Bayer process liquors, an advance in the art would be afforded.

THE INVENTION

A method for removing iron compounds from Bayer process liquors prior to alumina removal which comprises the steps of treating said Bayer process liquors with a water soluble ferrous salt such as ferrous ammonium sulfate, or ferric oxide, to form an iron-containing precipitate and then flocculating said precipitate with a polymeric flocculating agent.

In a preferred embodiment of the invention the Bayer process liquor is first treated as described above with the ferrous salt and then treated with at least 500 ppm of ferric oxide. Other water-soluble ferrous salts that may be used are: ferrous acetate, ferrous citrate, ferrous floride, ferrous iodide, ferrous nitrate, ferrous sulfate and ferrous sulfite.

As indicated, it is anticipated that the invention would treat the iron-containing precipitate formed by use of the water soluble ferrous salt alone or in conjunction with ferric oxide with a polymer flocculating agent. Flocculating agents used to remove red mud from Bayer process liquors are well known. They are usually either starch or sodium acrylate polymers, either alone or in combination with starch. Such flocculants and their uses is described in U.S. Pat. Nos. 3,390,959, 3,445,187 and 3,681,012, the disclosure of which is incorporated herein by reference.

When the sodium polyacrylates are used either alone or in combination with starch, they should have a molecular weight of at least 1,000,000 and preferably a molecular weight greater than 10,000,000.

The amount of ferrous salt, e.g.; ferrous ammonium sulfate may vary from as little as 10 ppm up to as much as 10,000 ppm depending upon the particular system being treated, residence time in the system, and the like. Typical dosages are between 500–3,000 ppm.

The ferric oxide is used in amounts as little as 500 ppm up to amounts slightly in excess of 10,000 ppm. A typical dosage would be about 2–10,000 ppm.

It is important to note that when the ferric oxide is used in combination with the ferrous salt that the addition be sequential, e.g. the water soluble ferrous salt be first added and then the ferric oxide.

To further illustrate the invention the following is presented by way of example.

TEST METHOD

Step 1

A well mixed sample of the slurry to be evaluated was portioned out into 1,000 ml nalgene graduated cylinders by filling all the cylinders to the 500 ml graduation. The remaining 500 ml were then added to the cylinders in the opposite order. The cylinders were immediately placed in a bath capable of maintaining the slurry at the appropriate temperature.

Step 2

The slurry was agitated with a rubber stoppered plunger four times prior to addition of the iron removal treatment and also agitated four times after addition of the treatment.

Step 3

After the appropriate treatment time a designated dosage of a 0.05% solution of a 39% aqueous emulsion containing ammonium polyacrylate having a molecular weight greater than 1,000,000 or a starch solution was used to flocculate the sample.

The sample was agitated with four plunges prior to addition of the flocculant and also agitated with four plunges after the addition of the flocculant. The settling rate can then be determined by two methods.

Method A: The interface was followed and timed between the 900–700 ml mark. The settling rate was calculated in ft/hr by dividing the distance by the time and adjusting to the proper units.

Method B: Timing was begun when flocs began to form. The compacted solids interface was followed and timing stopped when a maximum settled solids volume was reached. The settling rate was calculated by measuring the distance from the liquid level to the maximum point and dividing that distance by the time.

Step 4

After the appropriate time, a designated amount of liquid was removed from a consistent depth in the center of the cylinder. The liquor was filtered through a 0.45 micron filter and the filtrate was submitted for iron analysis using the ortho-phenanthraline method.

Step 5

The cylinders were allowed to remain in the hot bath. After 2 hours the cylinders were removed and the volume of settled solids recorded (compaction).

Step 6

The remaining contents from one cylinder for each set was filtered through two tared Whatman #4 filter papers. The residue was dried overnight at 105° C. and weighed. The solids (wt.%) content was calculated assuming 1.2 g/ml specific gravity.

EXAMPLE 1

The addition of 710 mg/l ferrous ammonium sulfate with aging for 60 minutes prior to treatment with starch resulted in reproducible iron reductions of 45 to 57% (Table I, Tests 1, 2, 3, 4 and 5).

TABLE I

Settling Study for the Iron Removal Testing

| Test No. | Sample No. | Dose (ml) | Solution % | mg/l | Settling Rate Method 1 ft/hr | Settling Rate Method 2 ft/hr | Compaction (cc) | Suspended solids (mg/l) | −0.45 μm iron (mg/l) |
|---|---|---|---|---|---|---|---|---|---|
| 1 | Ferrous ammonium sulfate/Starch | 7.1/10 | 10/0.17 | 710/17 | — | 8 | 65 | 75 | 7.6 |
| 2 | Ferrous ammonium sulfate/Starch | 0.71/15 | 10/0.14 | 71/21 | — | 9 | 80 | 69 | 18.2 |
| 3 | Ferrous ammonium sulfate/Starch | 7.1/15 | 10/0.14 | 710/21 | — | 6 | 82 | 44 | 7.8 |
| 4 | Ferrous ammonium sulfate/Starch | 35.5/15 | 10/0.14 | 3550/21 | — | very slow | 119 | 30 | 11.5 |
| 5 | Ferrous ammonium sulfate/Starch | 7.1/10 | 10/0.19 | 710/19 | — | 6 | 69 | 45 | 7.0 |
| 6 | Ferrous ammonium sulfate/Starch | 7.1/10 | 10/0.19 | 710/19 | — | 5 | 69 | 61 | 6.9 |

Thickener Feed; Temperature = 220° F.; Solids = 1.5 wt. %

The following additional examples illustrate the advantages of using ferrous ammonium sulfate with ferric oxide:

TEST METHOD

In this series of tests, the following procedure was used:

Laboratory Digest Slurry

1. Prepare slurry under the appropriate digest conditions, fraction out into 500 ml Nalgene cylinders and maintain temperature at 104° C. in a glycol/H$_2$O bath.

2. Agitate solution with rubber stoppered plunger four times prior to addition of treatment and agitate four times after addition.

3. If flocculation is required after the appropriate treatment time, agitate the sample with four plunges followed by a 1 ml addition of a 0.05% solution of a 39% aqueous emulsion containing ammonium polacrylate having a molecular weight greater than 1,000,000. Agitate with four more plunges and record settling rate if desired.

4. After the appropriate time, remove a designated amount of liquid from a consistent depth in the center of the cylinder.

5. Submit for iron analysis using the ortho-phenanthraline method. Note that samples are filtered through a 0.45 micron filter prior to work up.

Spiked Iron Caustic Solution

1. Prepare a hot 190 g/l (as Na$_2$CO$_3$) NaOH solution. Add a standard iron solution to 20 mg/l.

2. Portion out 100 ml volumes into 250 ml beakers, stopper, and place in boiling water bath.

3. Add treatment, mix for 15 seconds and allow samples to age for the appropriate period of time.

4. Filter samples through 0.45 micron filter, place 10 ml of filtrate in 100 ml volumetric, add 40 ml of concentrated HCl and dilute to volume.

5. Analyze by atomic absorption.

Using the above test methods, the addition of ferric oxide, Fe$_2$O$_3$, was found to be very effective at reducing the iron levels (Table II, Test 3–6.) It has also been shown that geothite (FeOOH), another iron fraction in the bauxite ore, may dissolve and either reprecipitate as geothite or undergo a phase transformation forming hematite. Calcium and the presence of hematite in the system will result in more hematite formation. Geothite also forms very fine particles that cause problems in the flocculation of red mud. These same fine geothite particles also undergo a phase transition on the surface forming a coating of hematite. The colloidal hematite coated geothite particles have been shown to be much easier to agglomerate and flocculate. It can then be understood that an addition of hematite particles would enhance the formation and agglomeration process and reduce the colloidal iron particles.

Test results indicate that both colloidal and soluble iron (sodium ferrate) appear to be present in the liquor. Addition of ferrous ammonium sulfate tranforms the soluble iron into magnetite. If this is followed by the addition of hematite which enhances the formation of colloidal hematite coated geothite particles and transformation of geothite to hematite with their subsequent agglomeration, a 79% reduction in iron can be obtained (Table II, Test 2). This value is 24% lower than either treatment alone. This is the only chemical treatment program able to reduce the iron values by more than 70%. This explanation is further verified by reversing the order of addition which results only a 45% iron reduction (Table II, Test 1). This may indicate that removing the colloidal iron material initially alters the equilibrium which lowers the soluble sodium ferrate levels and reduces the ferrous ammonium sulfate activity.

TABLE II

Iron Removal
Volume = 500 ml; Slurry = Lab Digest
(240° C.; TC = 200 g/l; Blow Off 27.9 mg/l iron)

| Test No. | 1 | 2 | 3 | 4 | 5 | 6 |
|---|---|---|---|---|---|---|
| Time (min)(1st & 2nd) | 25/5 | 5/25 | 30 | 30 | 30 | 30 |
| First Chemical[1] | $Fe_2O_3$ | FAS | $Fe_2O_3$ | $Fe_2O_3$ | Blank | $Fe_2O_3$ |
| Dose (ml/% solution) | 2/Dry | 3.5./10 | 1/Dry | 0.5/Dry | | 0.25/Dry |
| Dose (mg/l) | 4000 | 700 | 2000 | 1000 | 0 | 500 |
| Second Chemical | FAS | $Fe_2O_3$ | | | | |
| Dose (Ml/% Solution) | 3.5/10 | 2/Dry | | | | |
| Dose (mg/l) | 700 | 4000 | 0 | 0 | 0 | 0 |
| Flocculant* | APA | APA | APA | APA | APA | APA |
| Dose (ml/% solution) | 1/0.05 | 1/0.05 | 1/0.05 | 1/0.05 | 1/0.05 | |
| Time (min) | 30 | 30 | 30 | 30 | 30 | 30 |
| Settling rate (ft/hr) | | | | | | |
| Compaction (cc) | 35 | 37 | 40 | 38 | 42 | 49 |
| Iron (mg/l) | 11.8 | 4.6 | 10.8 | 16.6 | 22.8 | 15.1 |
| % Reduction | 45 | 79 | 50 | 23 | — | 30 |

*ammonium polyacrylate

Having thus described our invention, we claim:

1. A method for removing iron compounds from Bayer process liquors prior to alumina removal which comprises the steps of treating said Bayer process liquors with at least 10 ppm of a water-soluble ferrous salt to form an iron containing precipitate and then flocculating said precipitate with a polymeric flocculating agent.

2. The method of claim 1 where the ferrous salt is ferrous ammonium sulfate.

3. The method of claim 1 where the polymeric flocculating agent is from the group consisting of starch, acrylic acid polymers having a molecular weight of at least 1,000,000 and mixtures thereof.

4. A method for removing iron compounds from Bayer process liquors prior to alumina removal which comprises the steps of treating said Bayer process liquors with at least 10 ppm of a water-soluble ferrous salt, adding at least 500 ppm of ferric oxide to form an iron containing precipitate and then flocculating said precipitate with a polymeric flocculating agent.

5. The method of claim 4 where the ferrous salt is ferrous ammonium sulfate.

6. The method of claim 3 where the polymeric flocculating agent is from the group consisting of starch, acrylic acid polymers having a molecular weight of at least 1,000,000 and mixtures thereof.

* * * * *